Jan. 12, 1932. E. P. STENGER 1,841,069
PROCESS OF MAKING BIT HOLDERS
Filed Oct. 13, 1930
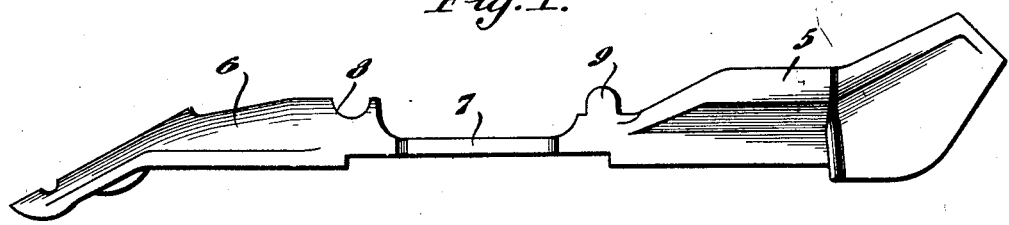
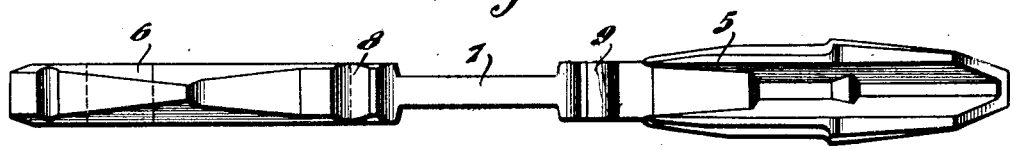
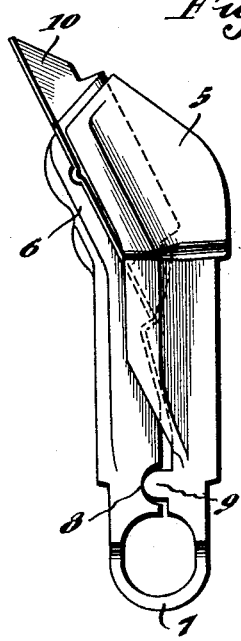
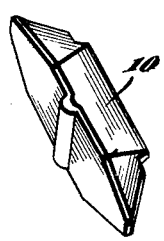
INVENTOR
Edwin P. Stenger
BY
Wood & Wood ATTORNEYS Patented Jan. 12, 1932

1,841,069

UNITED STATES PATENT OFFICE

EDWIN P. STENGER, OF CINCINNATI, OHIO, ASSIGNOR TO THE CINCINNATI MINE MACHINERY COMPANY, OF CINCINNATI, OHIO, A CORPORATION OF OHIO

PROCESS OF MAKING BIT HOLDERS

Application filed October 13, 1930. Serial No. 488,473.

This invention relates to mining machinery and is particularly directed to bit or cutting tooth holders for use in cutter chains and to the process of making the same. These bit holders are of the type used for supporting cutting teeth for shearing, slotting or undercutting coal deposits for removal and are designed for mounting the mining machine bits or teeth serially along stretches or lengths of power driven chain. The bit or tooth holder herein concerned is in the nature of an improvement over the bit holder described and claimed in Patent No. 1,795,804, issued March 10, 1931.

These bits or teeth and their respective holders along the chain are laterally disposed relative to the chain. Since the materials engaged by the power moved teeth vary considerably due to change of strata and the presence of hard substances dispersed throughout the coal, it is essential that the bit holders which support the bits in cutting positions within the respective chain lugs or links be extremely durable and capable of withstanding sudden shocks and tremendous shearing strains. The present bit holder for purposes of strength and durability is initially formed into a one-piece or integral element by forging processes.

It is an object of this invention to provide an improved bit holder of one-piece construction produced by forging, bending and heat treating processes in which the bit holder incorporates spaced jaws for receiving a bit or cutting tooth, said jaws being disposed under spring tension exerted from their joined ends for normally holding or maintaining the jaws in open or bit receptive position.

It is a further object of this invention, in view of the foregoing, to provide an improved process of making the bit holder, which process is extremely simple and in which process the steps are reduced to minimum, the ultimate product being one of superior durability and strength.

It is another object of this invention to provide an integral or one-piece bit holder which is of considerable value commercially because of its advantages of production. The number of parts to be assembled is reduced to an absolute minimum and consequently the care and labor needed in handling the parts in production is greatly lowered and lessened.

It is another object of this invention to provide a one-piece integral holder formed by forging having the principal advantage, resulting from the one-piece construction, that the metal, which is preferably alloy steel, is of uniform composition throughout. The advantage of this structure over a fabricated structure is that various elements of metal brought together and joined by welding, etc. are apt to be of different composition and therefore different tensile strength. Furthermore, the jointure of the parts necessitates an extra operation and there is always the possibility of the joints being faulty. In this improved article and process where the article is heat treated, as for tempering, the result of uniform forged composition of metal is that uniform heat treatment throughout results in uniform physical properties throughout. It is also possible to forge the holder in such fashion as to provide portions of relatively small cross section as the connecting strip of the holder jaws, therefore enabling the provision of greater flexibility at the point of small cross section. The heat treatment processes may be extended to the entire holder, that is, to the jaws as well as the connecting strip which is preferably spring tempered, with the result that the jaws have some flexibility although considerably less in degree than the connecting strip by reason of their much greater cross section. The physical properties imparted to the jaws by the tempering processes tend to greatly lessen the possibility of breakage of the jaws under shock and heavy shearing strains and therefore less tendency is present for the holder to fracture and crystallize.

Other objects and certain advantages will be more fully apparent from the description of the accompanying drawings, in which:

Figure 1 is a side elevation of the improved bit or tooth holder in its original forged condition or position.

Figure 2 is a top plan view of Figure 1.

Figure 3 is a side elevation illustrating the bit holder after the forming or bending step of the process wherein it is formed into the shape in which it is used, a bit or tooth being shown in position and the jaws shown in clamped position against the bit.

Figure 4 is a perspective view of the bit or tooth adapted for mounting in the holder.

The process for forming the finished bit holder includes the following principal steps. Initially, the article is forged to produce the jaw structures in contiguous longitudinal or outstretched arrangement, the various contours and configurations of the jaws for properly receiving the bit and affording the proper strength being included in the forging operation. This forging includes a narrow strip joining the jaw portions.

In the next step after a heating operation which may be or may not be limited to the strip portion, the jaws are swung toward each other or folded on the central portion of the strip connection until they face each other and provide a socket or are arranged in tooth receptive position.

Thereupon, as a third step, the entire holder is heat treated for temper to provide the proper spring quality to the narrow strip connecting the jaws, whereby the jaws are thereafter normally maintained in bit receptive or open position by the spring tension in the connection. The tempering step of the process, extended to the jaw portions, tends to give them tensile strength for withstanding great shearing stresses and sudden shocks. The characteristic of flexibility is not given to the jaws in the same degree as the strip due to the fact that the jaws are of considerably greater bulk or cross section.

As regarded in Figure 1 of the drawings, the respective jaw portions of the bit holder are indicated at 5 and 6. The jaw 5 is of considerably greater weight than the jaw 6, being located on the thrust taking side of the tooth. The lighter jaw 6 is engaged against the bit for preventing easy extraction and for binding the tooth between the respective jaws under a clamping action of any sort induced by forcing the jaws together against the spring tension in the connecting strip. The construction of these jaws has been fully described and claimed in the copending application so that it is not believed necessary to elaborate to any great extent relative thereto in the present case.

Toward the connecting strip 7 which is narrowed down in the forging process slightly over the general thickness of the jaws, a concavity 8 is provided across the upper side of one jaw 5 and a convexity 9 of the same contour and dimension is provided across the upper face of the other jaw 6. When the jaws are bent together or folded on the central point of the extent of the connecting or spring strip, the convexity and concavity interfit to provide the pivotal or rocking point for the jaws. The bit or tooth is indicated at 10 and is secured in the socket between the jaws by any clamping means forcing the jaws together.

The step of folding the jaws together may be accomplished during the step of spring tempering the connecting strip.

The holder is of primary value in respect to its one-piece integral forged construction. The operation of folding the jaws toward each other may be accomplished while the metal is cold depending on the composition of the particular alloy steel used. It is preferable that the property of flexibility be given to the connecting strip by spring tempering the same for augmenting the natural elasticity of the forging since it lacks the property of positively resisting deformation. It is of final importance that the tempering be extended to include the jaws although this operation is not intended to limit the broad features as outlined.

Having described my invention, I claim:

1. In the process of forming a bit holder, including jaws, the step of forging the jaws in out-stretched integral one-piece condition, the step of folding the jaws together on an intermediate portion, and the step of spring tempering the intermediate portion.

2. The process of forming a bit holder, including jaws, comprising, the step of forging the finished jaws in strip form or longitudinally aligned position and the step of heat treating and folding the strip structure on its intermediate portion for providing jaws and tempering the strip at the bend connecting the jaws.

3. The process of making a bit holder consisting of forming a pair of jaws in longitudinal alignment for a continuous blank, bending the formed blank to bring the jaws into relatively opposing relation, and temper treating the entire blank to give the proper tensile strength to the blank generally and flexibility to the bend thereof.

In witness whereof, I hereunto subscribe my name.

EDWIN P. STENGER.